United States Patent [19]

Breithaupt

[11] 4,183,044
[45] Jan. 8, 1980

[54] REMOTE CONTROL TV SUBCARRIER PHASE SHIFTER SYSTEM

[75] Inventor: David W. Breithaupt, Maple Shade, N.J.

[73] Assignee: RCA Corporation, New York, N.Y.

[21] Appl. No.: 910,888

[22] Filed: May 30, 1978

[30] Foreign Application Priority Data

May 30, 1977 [GB] United Kingdom ............... 22807/77

[51] Int. Cl.² ......................... H04N 9/04; H04N 9/44
[52] U.S. Cl. ......................... 358/17; 358/35; 358/41; 358/210
[58] Field of Search ................. 358/17, 35, 41, 149, 358/210

[56] References Cited

U.S. PATENT DOCUMENTS

| | | | |
|---|---|---|---|
| 2,808,455 | 10/1957 | Moore | 358/149 X |
| 3,215,774 | 11/1965 | Ikegami | 178/6.8 |
| 3,463,962 | 8/1969 | Bazin | 315/24 |
| 3,670,181 | 6/1972 | Pauly | 307/262 |
| 3,916,436 | 10/1975 | Mavey et al. | 358/1 |

FOREIGN PATENT DOCUMENTS 1925815 12/1970 Fed. Rep. of Germany ........... 358/210

OTHER PUBLICATIONS

ABU Tech. Rev. (Japan), No. 37, Mar. 1975, pp. 15–23.

Primary Examiner—Robert L. Richardson
Attorney, Agent, or Firm—Eugene M. Whitacre; Paul J. Rasmussen; Robert L. Troike

[57] ABSTRACT

The remote control of the subcarrier phase at each of a plurality of television cameras is provided by a digital encoder located near a remote monitor and camera switching network location. The encoder transmits binary coded signals to a color subcarrier phase shifter in the separate cameras. For the coarse phase selection, a first binary code signal selects a tap point along a delay line. For fine phase selection, a second binary code signal is decoded to provide D.C. voltage amplitude levels. These D.C. voltage levels are applied to a pair of comparators. The output from the tapped delay line is also applied to the comparators. The phase of the output from the comparators is advanced or retarded in direct correspondence to the amplitude level and polarity of the D.C. voltages applied to the comparators.

11 Claims, 2 Drawing Figures

REMOTE CONTROL TV SUBCARRIER PHASE SHIFTER SYSTEM

BACKGROUND OF THE INVENTION

This invention relates to a digitally controlled phase shifter and, more particularly, to a remote controlled subcarrier phase shifter for adjusting the phase of the color subcarrier signal at a color television camera.

In a multi-camera system, each camera must have its subcarrier signal properly phased so that, after all cable delays to a common video switcher, the color subcarrier signals from all of the cameras will be in the same phase at the switcher inputs. In a conventional subcarrier phase shifter system, a rotary switch on the camera enables the operator to select the coarse phase which was the closest to the desired phase. This rotary switch selects sections of a tapped delay line. In the prior art phase shifter system, the fine phase adjustment is provided by a mechanical potentiometer located on the camera that is coupled to a resistance of a resistance-capacitance circuit. The common video switcher is for example located at the operators's control console or at some remote location where there is a monitor to view the phase at the video switcher output. The conventional system requires an operator at the monitor and video switcher and a helper or operator located at the camera for making the adjustments. The system would also require some form of communication between the person located at the camera and the person at the monitor for communicating the information relating to position of the potentiometers and rotary switch and the reading of the subcarrier phase. It is therefore desirable to remotely control the subcarrier phase in the camera. It is also desirable to remotely control these phase shifters by digital signals to more accurately control the phase shifts even in a noisy environment.

SUMMARY OF THE INVENTION

Briefly, a system for remotely controlling the color subcarrier signal phase in a television camera is provided by a remote control unit having manual select controls for encoding binary digital code signals representing a selected phase shift. The camera includes a source of subcarrier signals and a digital phase shifter coupled to the source for selectively changing the subcarrier phase in response to the binary digital code signals. The remote control unit is coupled via a cable to the phase shifter portion of the television camera.

DESCRIPTION OF THE INVENTION

Figure 1:
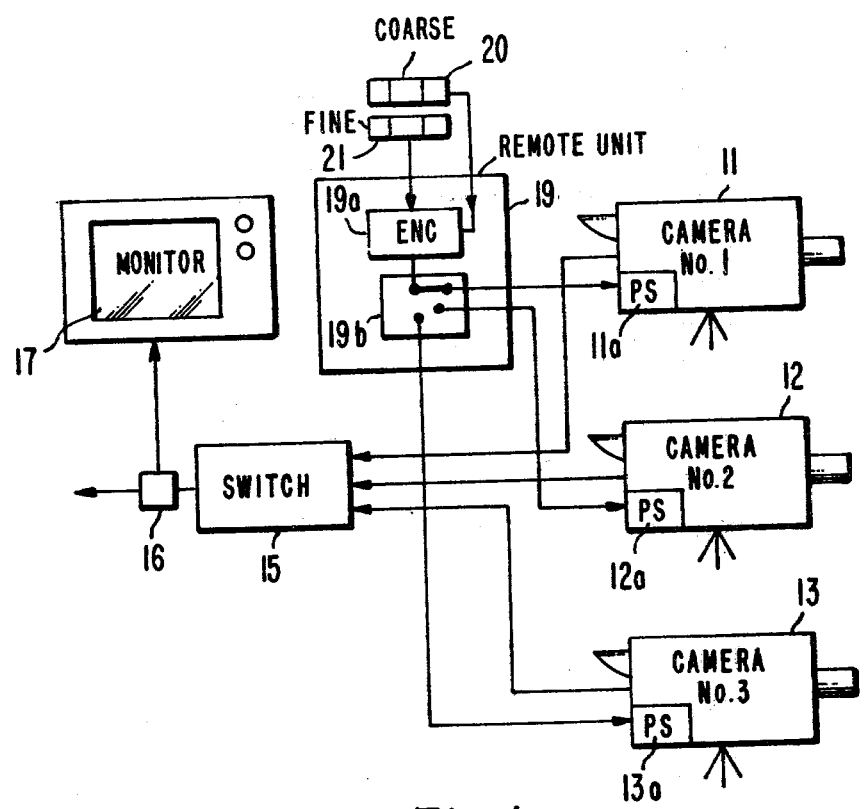
FIG. 1 is a block diagram of the system according to the present invention.

Referring to FIG. 1, there is illustrated a multi-camera system comprising cameras 11, 12 and 13. Each of these cameras 11, 12 and 13 includes a subcarrier source and phase shifter 11a, 12a and 13a. The subcarrier source is for example a reference oscillator for providing the color television subcarrier signal. For the NTSC system, this is 3.58 MHz. This subcarrier signal when adjusted for proper phase provides the subcarrier chroma reference signal for the TV camera. The video output from each of the cameras is applied to switcher 15. The operator at the switcher 15 selects which of the cameras 11, 12 and 13 is to be provided at the output thereof and transmitted. At the output of the switcher 15 is coupled a picture and waveform monitor 17 via coupler 16. In the operation of the system, the operator switches between the cameras 11, 12 and 13 at the switcher 15 and monitors the subcarrier phase. The remote control unit 19 includes an encoder 19a and a switcher 19b. The encoder 19a is responsive to coarse push buttons 20 representing coarse phase shift selections and fine push buttons 21 representing fine phase shift selections for providing coarse and fine binary digital code control signals. The binary digital code control signals are coupled via selection switch 19b to the appropriate phase shifter 11a, 12a or 13a. The digital code control signal adjusts the phase of the subcarrier signal at each of the cameras so that the video signals are in phase at the video switcher 15.

Figure 2:
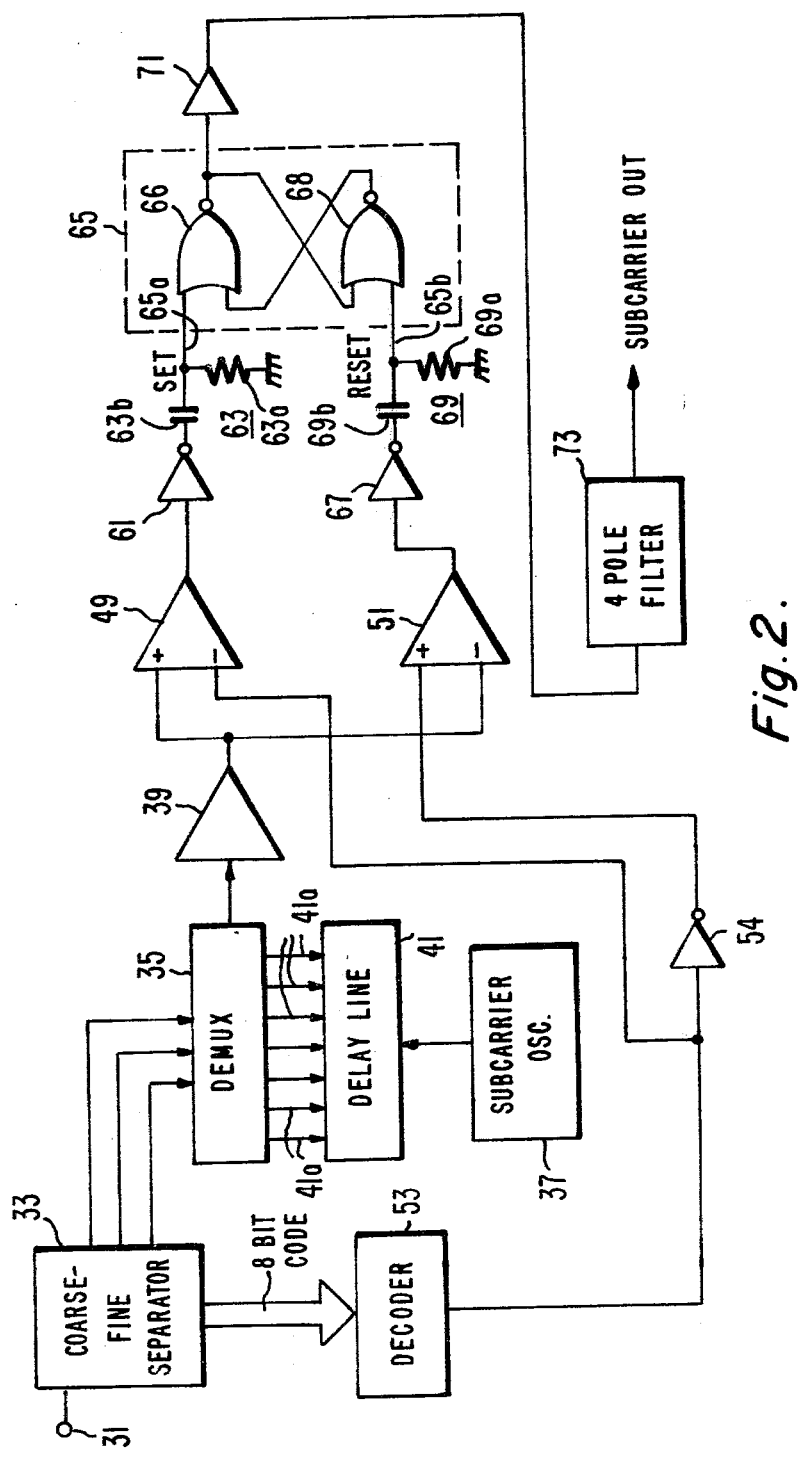
FIG. 2 is a block diagram of the subcarrier source and phase shifter.

Referring to FIG. 2, there is illustrated a block diagram of the subcarrier generator and phase shifter for each of the cameras. The coarse binary digital code signal from the encoder 19a is for example a three bit digital code for providing coarse phase information. This three bit code at terminal 31 is applied via separator 33 to a demultiplexer switcher 35. The separator 33 may be for example a sequencer wherein the first three bits are the coarse bits and the next eight bits are coupled from and to the fine control. The subcarrier master oscillator 37 provides the 3.58 MHz signal source for the example of an NTSC system. The reference master oscillator signal is applied to a delay line 41 which has for the example eight equally spaced taps 41a. These eight tapped outputs from delay line 21 which provide sequentially increasing delay at the tap points are coupled to the demultiplexer 35. The demultiplexer 35 is responsive to the three bit code signal applied thereto for selecting one of the eight taps from the delay line 41 to an amplifier 39. This coarse selection by the three bit digital code selects the subcarrier signal phase within forty-five degrees (360°/8) of the desired subcarrier phase.

The fine phase selector is provided via the comparators 49 and 51. The subcarrier signal from the demultiplexer 35 is amplified by amplifier 39 and applied to the non-inverting or plus input of comparator 49 and inverting input or a minus input terminal of comparator 51. An eight binary bit digital code from the encoder 19a for the fine phase shift is applied via terminal 31 and separator 33 to decoder 53. This eight bit code provides 256 levels of D.C. voltage ranging from −5 volts to +5 volts. The middle level of 128 would be zero volts. This zero volt level would indicate no fine phase shift change. A binary code higher than 128 level will provide a plus level and a binary code less than 128 level would provide a minus level. This fine phase select code is provided at the encoder 19a by the separate set of fine phase shift buttons 21. The decoded D.C. voltage signal from decoder 33 is applied directly to the inverting or minus input terminal of comparator 49 and through inverter 54 to the non-inverting or plus terminal of comparator 51. The output from comparator 49 is applied via an inverter 61 and a differentiator 63 to the set input 65a of set-reset flip-flop 65. Similarly, the output from comparator 51 is coupled via inverter 67 and differentiator 69 to the reset input 65b of flip-flop 65. At the output of flip-flop 65 are square waves whose edges are advanced or retarded in phase with respect to the reference phase from the demultiplexer 35 by the amount and polarity of the D.C. voltage applied from decoder 53. Differentiators 63 and 69 are used to provide toggling pulses for the set-reset flip-flop 65. The inverters 61 and 67 are used so that the flip-flop 65 initially responds to falling rather than rising edges which has been found to be more stable with temperature in accordance with the type of devices used. The system with the flip-flop 65 is arranged to have a 50% duty cycle. A plus voltage from the decoder 53 causes the rising edge of the output signal from the comparator 49 to be delayed slightly on the positive half cycle of a sine wave for example and the falling edge of the output signal from comparator 51 to be delayed on the negative half cycle. These rising and falling edge signals generate toggling pulses to the set and reset inputs of flip-flop 65. The flip-flop 65 is made up of NOR gates 66 and 68 arranged to operate on a 50% duty cycle to provide low harmonic distortion. The output from the flip-flop 65 is applied via buffer stage 71 to a 4-pole active butterworth type filter 73 to thereby provide the subcarrier output signal at the desired phase. If the input subcarrier phase is to be advanced, the minus D.C. voltage to the comparators 49 and 51 causes triggering of the flip-flop 65 sooner, advancing the phase in both the positive and negative half cycles. The differentiator 63 is provided by resistor 63a and capacitor 63b and the differentiator 69 is provided by resistor 69a and capacitor 69b.

The system described above was constructed and operated and had the following type components:

Demultiplexer 35—RCA type CD4051
Delay line 41—RCL delay line with approximately 300 $n_s$ delay
Comparators 49 and 51—Motorola type MC3432
Inverters 61 and 67—NOR gate type TTL7402
NOR gates 66 and 68—Type TTL7402
Capacitors 63b and 69b—33pF
Resistors 63a and 69a—1 K resistor

What is claimed is:

1. A system for remotely controlling the color subcarrier signal phase in a television camera including a source of color subcarrier signals, comprising:
    encoder means remotely located from said camera and having manual phase select means for providing binary digital code signals representing a selected phase shift of the color subcarrier in the camera,
    said camera including a digital phase shifter coupled to said source for selectively changing the subcarrier phase, and
    means for coupling said binary digital code signals from said remote means to said digital phase shifter in said camera for providing remote adjustment of the subcarrier phase.

2. The combination of claim 1 wherein said phase shifter includes a tapped delay line and switching means coupled to said delay line and responsive to said binary code signal for providing subcarrier signals at a selected tap along the delay line to the output thereof.

3. The combination of claim 1 wherein said phase shifter means includes decoder means responsive to said binary digital code signals for providing D.C. voltages representative of said code signals and comparator means responsive to said subcarrier signals and said D.C. voltages for advancing or retarding the phase of said subcarrier signals in response to D.C. voltages decoded.

4. The combination claimed in claim 1 wherein said phase shifter includes a coarse phase shifter and a fine phase shifter, said coarse phase shifter including a multiple tapped delay line coupled to said source and switching means coupled to said delay line, said switching means being responsive to said binary code signals for providing signals at a selected tap to the output thereof, said fine phase shifter including decoder means responsive to said binary digital code signals for providing D.C. voltages representative of said fine binary coded signals and comparator means, said comparator means being responsive to the selected tap delay output from said delay line and said D.C. voltage for advancing or retarding the phase shift of said subcarrier signals from said delay line in response to the D.C. voltages decoded.

5. The combination claimed in claim 2 including, a flip-flop responsive to the outputs of said comparator means for providing a 50% duty cycle square wave wherein the phase of the leading and trailing edges of the square wave are determined by the D.C. voltage decoded.

6. The combination claimed in claim 5 above including a four-pole butterworth filter coupled to the output of said flip-flop for filtering the output from said flip-flop to provide the selected subcarrier signal.

7. A system for remotely controlling the color subcarrier phase of a plurality of cameras which outputs are coupled to a common video switcher and video monitor so as to maintain the same color subcarrier phase relationship at the switcher regardless of the cable lengths or camera differences comprising:
    encoder means located near said video switcher and monitor and responsive to a manually operated control for providing binary coded signals representing the subcarrier phase selected by said control,
    each of said cameras including a source of subcarrier signals and a digital phase shifter coupled to said source,
    means including a switch for coupling the binary coded signals to a selected one of said digital phase shifters, said digital phase shifter being responsive to said binary coded signals for adjusting the phase of said color subcarrier signals from said source.

8. The combination claimed in claim 7 wherein said digital phase shifter includes a tapped delay line responsive to said subcarrier signals and switching means coupled to said delay line said switching means responsive to said binary coded signals for switching a tapped point along said delay line corresponding to the code to the output thereof.

9. The combination claimed in claim 8 wherein said phase shifter includes a binary decoder means responsive to said binary coded signals for providing D.C. voltages corresponding to said binary signals and comparator means responsive to said subcarrier signal and said D.C. voltages for advancing or retarding the phase of the subcarrier signal in response to the detected voltages applied to the comparator means.

10. The combination claimed in claim 9 including flip-flop means responsive to the output of said comparator means for providing square waves phase shifted according to said D.C. voltages.

11. The combination claimed in claim 10 including a differentiator means coupled between said comparator means and said flip-flop means for providing toggling pulses to said flip-flop.

* * * * *